United States Patent [19]
Domeier et al.

[11] Patent Number: 4,809,191
[45] Date of Patent: Feb. 28, 1989

[54] ROBOTIC POSITION SENSOR

[75] Inventors: Wayne H. Domeier, Allston; Laurence D. Chin, West Newton, both of Mass.

[73] Assignee: Barry Wright Corporation, Newton Lower Falls, Mass.

[21] Appl. No.: 44,593

[22] Filed: Apr. 28, 1987

[51] Int. Cl.[4] .................. B65H 43/02; G01B 5/02
[52] U.S. Cl. ........................... 364/513; 324/251; 901/32; 901/39; 901/46
[58] Field of Search ............... 364/513, 563; 271/85, 271/268; 901/46, 32, 39; 414/730; 324/251

[56] References Cited

U.S. PATENT DOCUMENTS

| | | | |
|---|---|---|---|
| 3,968,885 | 7/1976 | Hassan et al. ............... | 901/39 X |
| 4,591,198 | 5/1986 | Monforte ..................... | 901/39 X |
| 4,634,107 | 1/1987 | Vandersyde et al. .......... | 270/58 X |
| 4,697,246 | 9/1987 | Zemke et al. ................. | 364/551 X |
| 4,699,414 | 10/1987 | Jones ............................. | 901/39 X |
| 4,707,013 | 11/1987 | Vranish et al. ................ | 901/39 X |
| 4,720,675 | 1/1988 | Bishop et al. ................. | 324/110 |
| 4,723,806 | 2/1988 | Yuda .............................. | 901/39 X |

Primary Examiner—Allen MacDonald
Attorney, Agent, or Firm—Milton E. Gilbert

[57] ABSTRACT

An electromechanical manipulator including gripper elements provided with a plurality of fingers and a sensing element provided for each of the fingers to sense their relative position. The sensing means includes at least one Hall effect element disposed in the body of the gripper element. A magnet element is oriented in a bipolar slide-by mode with respect to the Hall effect element and is disposed for movement with one of the fingers of a gripper element.

6 Claims, 5 Drawing Sheets

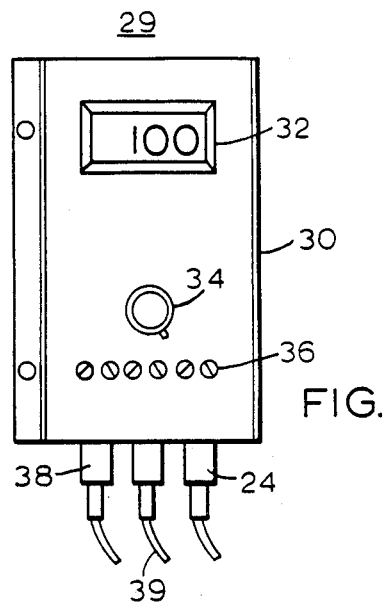
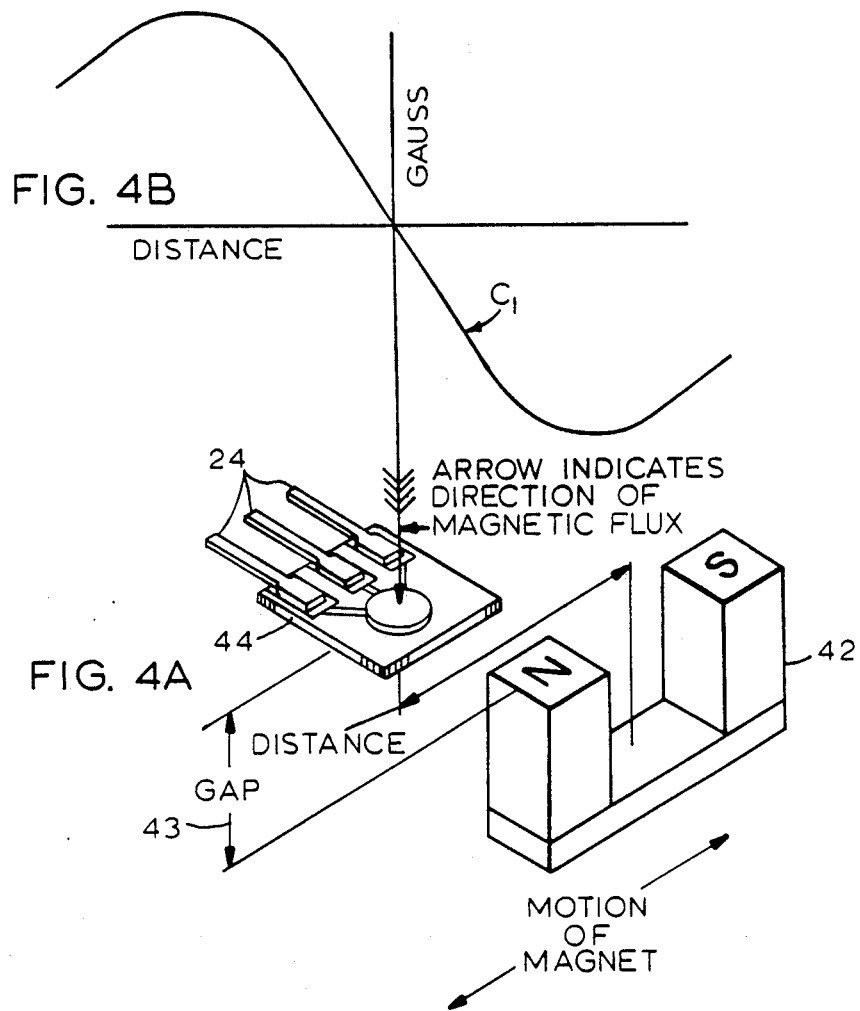

ROBOTIC POSITION SENSOR

BACKGROUND OF THE INVENTION

This invention relates to devices for sensing the position of robot fingers, and in particular, relates to apparatus for providing linear sensor response to robot finger position.

The term "robot" is used to denote an electromechanical manipulator. The use of robots in industry has been growing at an accelerating pace in recent years. Robotic applications have also become more complex in nature, requiring closed loop feedback systems with integral sensing. Such feedback loops are utilized to evaluate characteristics of the objects being manipulated by the robot, and to provide the capability of real-time adjustments in the robotic process.

It is therefore extremely important to have adequate sensing apparatus incorporated in end-of-arm tooling of a robotic device to determine the type of workpiece being processed, whether the workpiece has been gripped correctly, and whether the workpiece is being handled or positioned correctly. Additionally, the successful use of robotic devices depends in large part upon the adaptability of such devices to accommodate different parts. Various sensors, such as optical and tactile sensors, are employed to generate necessary feedback signals.

In technologies applied to assembly line settings, for example, tactile sensors such as path, force or moment sensors are required to identify the position and size of parts to be manipulated.

In many cases, the signals generated by such sensors are compared to specific size thresholds.

Most conventional industrial robots include a gripper assembly, a signal processing network, and a process controller, which receives, for example, position signals from the gripper assembly, and transmits to the gripper assembly control signals via a control loop.

Feedback for controlling the execution of robotic processes may be provided by position sensors for robot fingers.

Finger position sensors for industrial robots are known in the art. A gripper assembly incorporating such a sensor is disclosed in U.S. Pat. No. 4,509,783 to Ionescu. In the Ionescu patent, a gripper device is disclosed having a body formed with a piston chamber in which a piston is mounted. A pair of spaced fingers is connected to the body, and a crossbar and toggle links connect adjacent fingers, so that actuation of the piston effects the operation of the fingers between an opened and closed position. A first sensor device is disposed between the fingers to measure the lateral distance therebetween, and a second sensor is disposed between the body and a moveable cap supported thereon to measure displacement between the cap and the body.

Another gripper device incorporating a sensor is disclosed in U.S. Pat. No. 4,611,296 to Niedermayr. The Niedermayr patent discloses a robot manipulator having a sensor mounted on a moveable part of the robot which is connected to a control unit through a programmable sensor interface. The Programmable sensor interface includes microprocessor elements and memory elements. Each sensor has three signal ranges allocated thereto, and the signal ranges are stored in the memory element.

One widely used type of linear displacement sensor used in robotic applications is based on the Hall effect. The Hall effect is a superior sensing technology because it provides a virtually infinite cycle life. The simplest form of Hall effect technology is the Hall effect element, constructed from a thin planar sheet of conductive material with output connections oriented perpendicular to the direction of current flow. When the Hall effect element is subjected to a magnetic field, the element responds with an output voltage proportional to the applied magnetic field strength. The voltage output is typically on the order of millivolts and requires additional electronics to achieve useful voltage levels.

The combination of a Hall effect element and associated amplification electronics is called a Hall effect transducer. Such Hall effect transducers convert a magnetic field to an electrical signal. Linear displacement can be measured using a Hall effect transducer by inducing motion of a magnet relative to the sensor element. The voltage output of the Hall element will then be proportional to the flux density at the point where the transducer is located.

Prior Hall effect transducers for robotic devices have employed a unipolar head-on configuration for the sensing of linear displacement. The term head-on refers to the manner in which the magnet moves relative to the tranducer's reference point. In the head-on mode, the magnet's direction of movement is directly toward and away from the transducer, with the magnetic lines of flux passing through the transducer's reference point. The magnet and transducer are positioned so that one pole of the magnet will approach the sensing face of the transducer.

Such prior art linear displacement sensors have several associated disadvantages, the most serious of which is non-linear response to displacement. In the unipolar head-on mode, the relationship between output voltage and the distance between magnet and sensor may be modelled by a decaying exponential curve. The curve is exponential because as the sensor approaches the magnet, the magnetic field becomes exponentially stronger. That is, exponentially more lines of flux are cut by the sensor as distance decreases.

When utilized in a robotic position sensor, unipolar head-on Hall effect transducers accordingly generate non-linear responses to changes in position of the sensed target.

It is therefore an object of the invention to provide an improved manipulator position sensor.

It is a further object of the invention to provide an improved manipulator position sensor utilizing Hall effect sensing and having a linear response to changes in manipulator position.

It is also an object of the invention to provide sensing apparatus which can store a plurality of position set points for comparison with sensed manipulator position.

SUMMARY OF THE INVENTION

The invention discloses an electromechanical manipulator, including a gripper element for manipulating a workpiece. The gripper element includes a body and a plurality of fingers. The invention also includes a sensing element, for sensing the relative position for each of the plurality of fingers. The sensing means includes at least one Hall effect element disposed in the body of the gripper element. A magnet element disposed for movement with one of the fingers of the gripper element is oriented with respect to the Hall effect element in a bipolar slide-by mode In the bipolar slide-by mode, the gap between the magnet element and the Hall effect element is constant, and the Hall effect element is disposed transversely with respect to the dipole axis. The dipole axis of the magnet is parallel to the plane of the Hall effect element, and the magnet moves North to South across the plane of the Hall effect element. As a consequence of this configuration, a constant number of flux lines are cut by the sensor as the magnet moves across the sensor. This results in a substantially linear sensor response as a function of relative movement of the fingers. The bipolar slide-by mode is thus superior to the head-on mode of prior art manipulator sensors, which give a non-linear response.

Another aspect of the invention includes signal conditioning elements for conditioning signals generated by the sensing element representative of the relative position of the manipulator fingers.

A further aspect of the invention includes a logic network for dividing the range of manipulator finger travel into linear gradations. In a preferred embodiment of the invention, the operating range so divided into linear gradations includes a number of setpoints. The setpoints include an output corresponding to the fully opened position of the fingers, and a setpoint corresponding to the fully closed position of the fingers. Additional setpoints intermediate said positions are provided, and are adjustable by the user to accommodate the dimensional characteristics of objects to be manipulated. In a further preferred embodiment of the invention, the setpoints are adjustable by calibrating associated trimpots.

A further aspect of the invention discloses a digital voltage display (DVD) for displaying the output voltage generated by the Hall effect sensor. The DVD facilitates calibration of the open, closed, and intermediate setpoints by the user. A preferred form of DVD utilizes a liquid crystal display (LCD).

In another aspect of the invention, a tolerance adjusting element is provided, for adjusting a voltage range tolerance associated with each setpoint. The size of the tolerance, or the "window", associated with each setpoint can be adjusted by the user to suit varying applications.

The invention will next be described with certain illustrated embodiments. However, it should be clear that various changes, modifications and additions can be made by those skilled in the art without departing from the scope of the invention as defined in the claims.

BRIEF DESCRIPTION OF THE DRAWINGS

For a fuller understanding of the nature and objects of the invention, reference should be made to the following detailed description and the accompanying drawings in which:

FIG. 3 is a front view of a control/output element according to the invention;

FIG. 4A is a perspective view of a Hall effect transducer utilizing a bipolar slide-by configuration according to the invention;

FIG. 4B is a distance to Gauss graph corresponding to the transducer of FIG. 4A;

Throughout the drawing figures, like reference numerals are used to indicate corresponding parts.

DESCRIPTION OF ILLUSTRATED EMBODIMENTS

Figure 1:
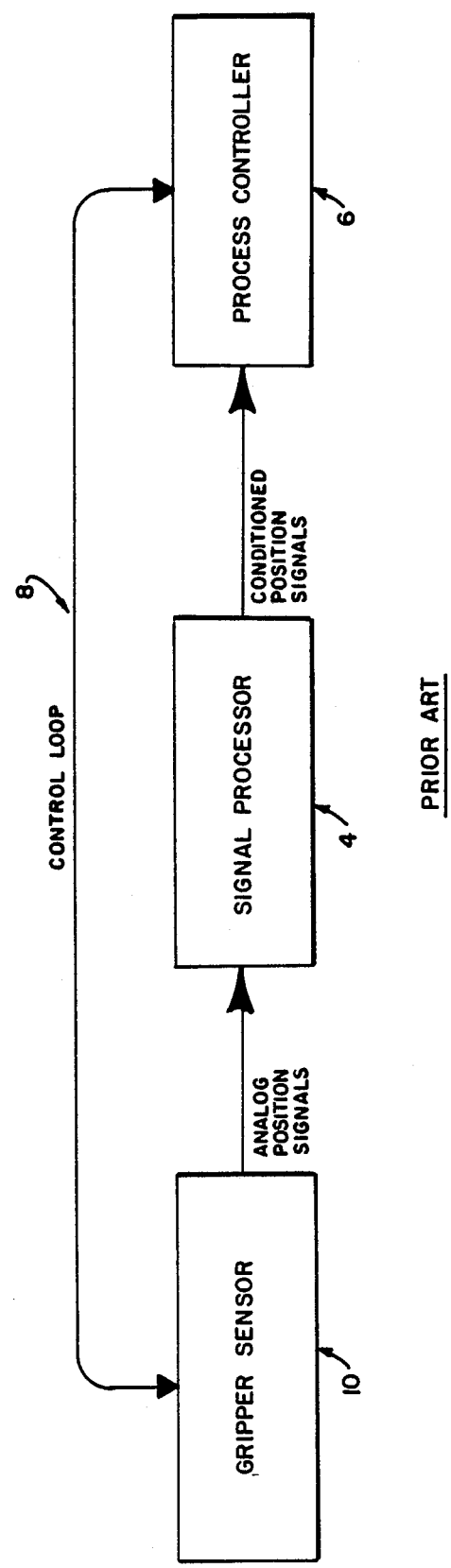
FIG. 1 is a block diagram illustrating the operation of a prior art robotic system.

FIG. 1 illustrates a conventional robotic system known in the art. A gripper 10 incorporating a sensor element is controlled by process controller 6 which transmits control signals over control loop 8. The sensor element incorporated into gripper 10 transmits analog signals representative of manipulator position or displacement to signal processor block 4. Signal processor block 4 typically contains signal conditioning and amplifying electronics for conditioning position signals generated by the manipulator/sensor block 10. Conditioned signals generated by signal processor 4 are transmitted to process controller 6, thereby completing the feedback loop required in conventional industrial robotics applications.

Figure 2A:
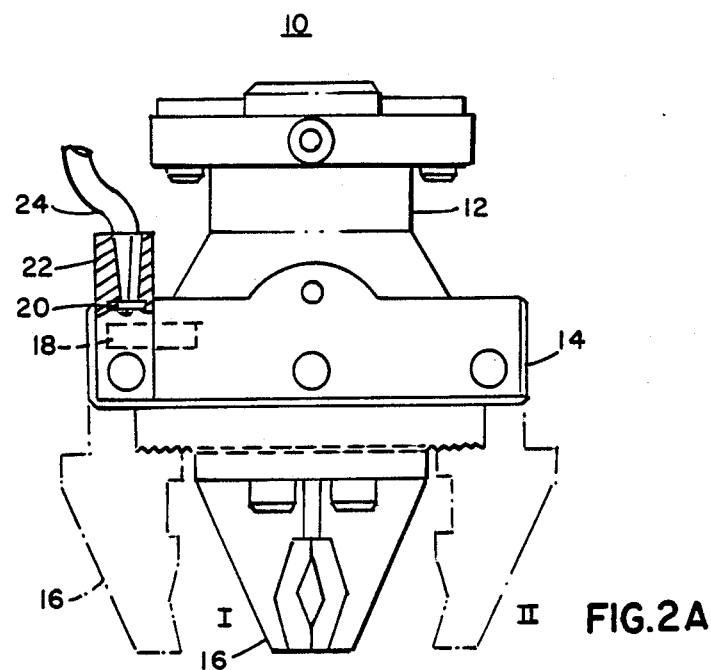
FIG. 2A is a partially cut away front view of a robotic manipulator, incorporating a Hall effect sensor, according to the invention.

FIG. 2A is an elevation perspective view of a gripper according to the invention. The gripper 10 includes a housing 12 to which a finger block 14 is slidably mounted. The connection of finger block 14 to housing 12, which forms no part of the invention, is preferably of conventional construction in accordance with parallel gripper design. Accordingly, fingers 16 are illustrated as fully closed in Position I in solid lines and fully opened at Position II in phantom. Fingers 16 move together or apart between these positions as actuated by pneumatic or hydraulic pressure applied to the interior of housing 12 in a manner known in the art.

Figure 2B:
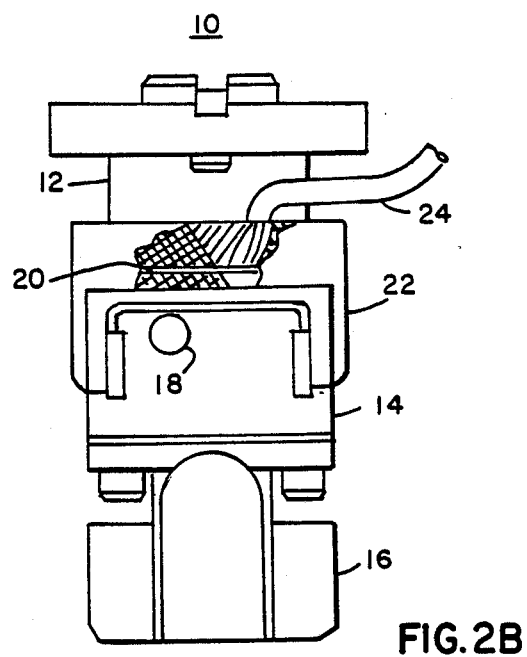
FIG. 2B is a partially cut away side view of the manipulator of FIG. 2A.

Magnet 18 is mounted on finger block 14 so that the dipole axis of magnet 18 is oriented along the direction of finger travel. Hall effect sensor 20 is positioned adjacent to finger block 14 by way of sensor bracket 22 which is fixedly secured to housing 12. As shown in FIG. 2B, sensor bracket 22 is generally C-shaped. Sensor 20, which generates signals indicative of linear displacement as discussed in further detail below, transmits such analog signals along cable 24 which can be used to communicate with external control devices.

Magnet 18 is preferably mounted in a hollow portion such as a blind hole formed in the side of finger block 14. Such a configuration maintains a low tooling profile which is suited for a variety of applications.

As discussed above, cable 24 is used to transmit signals to external process controllers and output elements. One such output element is illustrated in FIG. 3. Fi 3 is a front view of a user operated control device 29. The device includes a housing 30 which houses output electronics discussed in further detail hereinafter. The housing 30 also includes a display 32 and a multiposition switch 34. The control device 29 also provides access to a plurality of trimming potentiometers 36 referred to as "trimpots". The control device 29 communicates with the gripper assembly 10 by way of cable 24. Cables 38 and 39 are provided for additional inputs or outputs to or from the control device 29.

The display 32 is referred to as a digital voltage display (DVD) and is preferably Of the liquid crystal display (LCD) type to reduce energy requirements.

In operation, the DVD 32 output is indicative of the linear displacement or position of fingers 16 on gripper assembly 10 in that it shows the processed voltage signals representative of sensed signals generated initially by Hall effect sensor 20 on gripper 10.

The configuration of magnet and Hall effect sensor on a gripper according to the invention is illustrated in FIG. 4A. FIG. 4A is a perspective view of a Hall effect transducer according to the invention utilizing a bipolar slide-by configuration. A graph of distance to field strength for such a Hall effect configuration is illustrated in FIG. 4B.

Referring to FIG. 4A, the dipole axis of the magnet 42 is oriented parallel to the plane of Hall effect element 44. The space between the magnet 42 and the Hall effect element 44 is referred to as the transducer gap 43. The displacement between a center line drawn normal to the plane of the Hall effect element 44 and the center line drawn normal to the axis of the dipole is referred to as the displacement distance.

While FIGS. 4A and 4B illustrate the full range of response from the bipolar slide-by arrangement used in the invention, it is to be understood that only a linear portion of the full range is used, as described more fully below.

While FIG. 4A illustrates a U-shaped magnet, a bar magnet can also be utilized. The configuration illustrated in FIG. 4A yields a distance to field strength graph which has an "S" shaped curve as shown in FIG. 4B, C1, which has both positive and negative excursions, forming the basis for the term bipolar. The positive and negative halves of the curve are the result of the proximity of the magnet's North or South pole and whether the magnet is to the right or the left of the center line of the Hall effect element 44, which forms the reference point from which distances are measured in the graph. Separating the poles of the magnet as illustrated in FIG. 4A reduces the steepness of the center portion of the curve shown in FIG. 4B.

It will be noted that the resulting distance to field strength curve C1 for the transducer illustrated in FIG. 4A graph has a significant linear portion between the points of inflection. This is to be contrasted with the distance to field strength curve C2 shown in FIG. 5B.

Figure 5B:
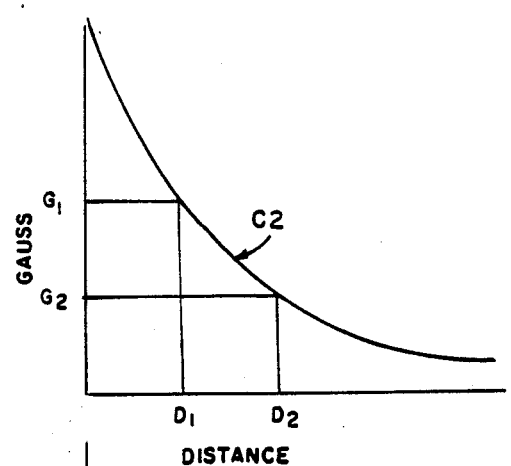
FIG. 5B is a distance to Gauss graph corresponding to the transducer of FIG. 5A.
Figure 5A:
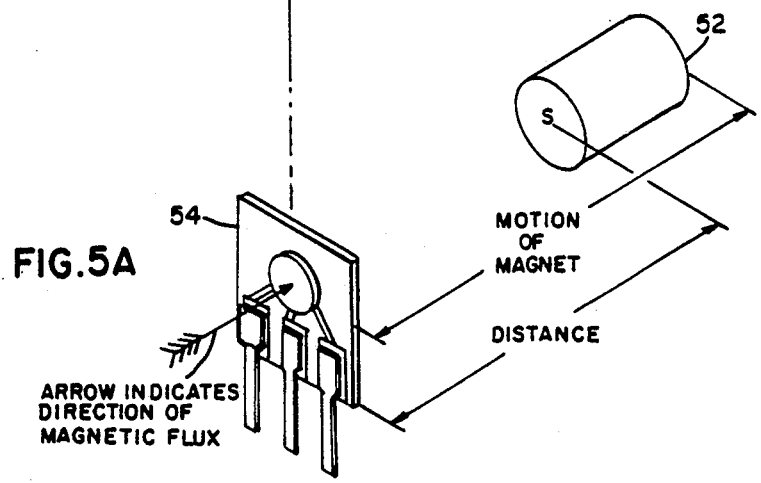
FIG. 5A is a perspective view of a prior art Hall effect transducer utilizing a unipolar head-on configuration.

The distance to field strength graph shown in FIG. 5B corresponds to the unipolar head-on configuration illustrated in FIG. 5A. The head-on configuration illustrated in FIG. 5A is typical of prior art robotic position sensors. In such a configuration, the South pole of magnet 52 faces the Hall effect element 54. The axis of the dipole of magnet 52 is normal to the plane of Hall effect element 54. The displacement of the South pole of magnet 52 from the plane of Hall effect element 54 is referred to as the displacement distance as illustrated in FIG. 5A. The magnet 52 moves in a reciprocating manner toward or away from Hall effect element 54 in a direction parallel to the North/South axis of the magnet 52. The term head-on therefore refers to the manner in which the magnet 52 moves relative to the Hall effect element 54 along an axis coincident with its center line, which again forms the reference point from which distances are measured in the graph.

The magnet 52 and the Hall effect element 54 are positioned so that the magnetic lines of flux generated by magnet 52 pass through this reference point. In the configuration illustrated in FIG. 5A only magnet lines of flux in the positive reference direction are detected, and as a result this mode is known as unipolar. In the unipolar head-on mode the relationship between distance and field strength is modelled by a decaying exponential curve, C2. Distance is measured from the face of the transducer to the South pole of the magnet 52 along the direction of motion.

It will be seen from the graph of FIG. 5B that the relationship between distance and field strength is non-linear. This non-linearity is a disadvantage of prior art transducers used in robotic displacement sensors, and it is this disadvantage which is eliminated by the transducer configuration of the present invention.

Figure 6:
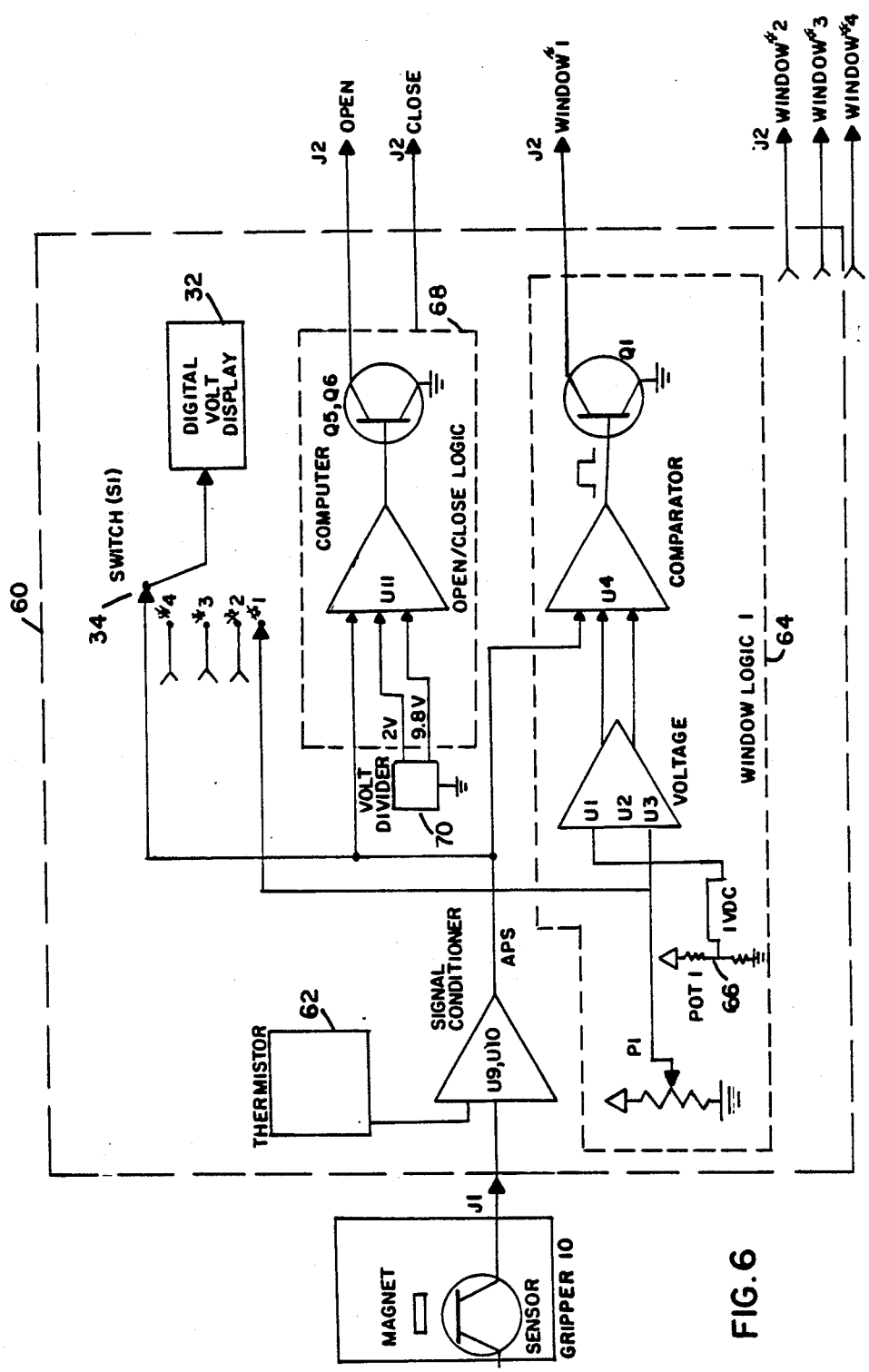
FIG. 6 is a block diagram of signal processing logic utilized in accordance with the invention.

FIG. 6 is a block diagram of signal processing logic comprising an analog position module 60 utilized in accordance with the invention. Gripper block 10 schematically illustrates the relationship between the magnet and the sensor in a gripper according to the invention.

In summary, when the Hall effect transducer 20 (FIG. 2A) is placed in the bipolar slide-by configuration discussed above, and the magnet moved with respect to the sensor element 20 along an axis parallel to that of the dipole axis of the magnet and between positions intermediate to the North and South poles of the magnet, an electrical output is generated by the Hall effect element which is approximately linear in proportion to the distance the magnet is moved.

In a preferred embodiment of (FIG. 2B) the invention, the Hall effect element 20 is situated within the gripper housing 12, as discussed above, where it remains stationary and the magnet 18 is housed within the fingerblock 14 in such a manner that when the fingers 16 are in their closed position, the Hall effect element 20 is disposed over one of the poles of the magnet 18, that is, a perpendicular from the sensor intersects the dipole axis at a location proximate one of the magnetic poles. As the fingers 16 move to their fully open position shown in phantom (FIG. 24) the magnet 18 translates with respect to the sensor 20 along an axis parallel to the dipole axis. On attaining the fully open position, a perpendicular from the sensor element 20 intersects the dipole axis at a location proximate the other of the magnetic poles. Preferably, the perpendicular would fall intermediate the North and South poles near but not at the ends of the magnet 18 so as to avoid the increased flux density at the ends of the magnet 18 and thereby avoid the non-linearity associated therewith.

The Hall effect element 20 illustrated in gripper block 10 in FIG. 6 preferably has an electrical output which decreases in voltage as the magnetic field around it increases in strength. Accordingly as the robotic fingers 16 open, the magnet's translation cuts more magnetic lines of flux causing the Hall effect transducer output to decrease in voltage.

In accordance with the invention the output signal for the Hall effect element is electronically processed to yield a linear response representative of the displacement of fingers 16.

The voltage signal produced by the Hall effect element 20 of the invention is on the order of millivolts and must therefore be amplified and conditioned to achieve useful output signals. Additionally in the present invention, window logic and setpoint logic are provided to increase the utility of the transducer system in robotics applications. These amplification and signal conditioning elements are illustrated for one embodiment of the invention in FIG. 6.

The output from the Hall effect element is transmitted along connector J1 shown in FIG. 6. The signal conditioning elements U9 and U10 then process the output signal.

In one embodiment of the invention, U9 is an operational amplifier ("op amp") configured as a voltage subtractor, that is, the output equals the difference of the two inputs, a mode of operation well known in the art. The signal conditioning block U9, U10 preferably contains a potentiometer for tapping off a reference voltage of between 0 and 12 volts DC. This potentiometer provides zero adjust and is preferably accessible by the user for calibration. When the gripper fingers are in their closed position a nominal voltage of 6 volts DC is applied to one input of op amp U9. The zero adjust is varied until an equal voltage is applied to the second input of op amp U9, thus causing a 0 volts output of the op amp U9. When the fingers of the gripper are opened causing the magnet to move with respect to Hall effect element accordingly causing the output of the Hall effect element to decrease in voltage, the output of the op amp U9 increases. This output is fed to amplifying element U10. A unity inverter of U10 senses the voltage from the output of op amp U9 and outputs a correspondingly inverted voltage. The amplifying element U10 preferably also contains a non-inverting amplifier having adjustable gain for amplifying the output from the unity inverter. The output of the non-inverting amplifier section of U10 is referred to as the analog position signal ("APS").

The digital voltage display (DVD) described above in connection with FIG. 3 is shown as block 32 in FIG. 6, and monitors the APS through a user selectable switch 34. The DVD block 32 reads out the APS as 0 when the APS equals 0 volts DC and as 100 when the APS equals 10 volts DC. As described above, the 0 and 10 volt APS values are calibrated by appropriate potentiometers 36 (FIG. 3). Displays of 0 through 100 of the DVD 32 represent a 100 unit range of gripper travel. This can be thought of in terms of the percentage of the full travel of the fingers. The 100 unit range of gripper travel thus displayed is substantially linear because of the bipolar slide-by configuration utilized in the invention. When the electronics illustrated in FIG. 6 are incorporated with the gripper illustrated in FIG. 2, a display of 0 preferably represents a totally closed finger position and a display of 100 represents completely opened finger position. When the user wishes to set the zero adjust and full scale adjust, corresponding to 0 and 100 display values, respectively, the user selects the associated position of switch 34 which permits the monitoring of the APS.

In accordance with the invention, the electronics illustrated in FIG. 6 provide a plurality of user adjustable setpoints for triggering output signals indicative of predetermined finger positions. These setpoints are provided by the window logic block 64. For purposes of clarity only one window logic block is illustrated. It will be obvious to one skilled in the art, however, to incorporate additional window logic blocks which are indicated as windows 2 through 4 (associated with the position of switch 34).

The illustrated window logic block 64 includes potentiometer, P1, voltage addition sections U1 and U2, voltage subtraction section U3, comparator U4 and output transistor Q1. Potentiometer P1 can preferably be manually adjusted so that it taps a voltage between 0 and 12 volts DC and sets a setpoint. A given voltage tapped by potentiometer P1 can be displayed by DVD 32 by appropriate switching of switch 34.

If, for example, the user switches the monitor switch 34 to position 1, corresponding to window 1, the user can then vary the potentiometer P1 until a display of 50 appears on the DVD 32. This display may correspond, for example, to minus 5 volts DC tapped by potentiometer P1. This voltage is sensed by the input of voltage addition section U1 which is configured as a voltage addition section. A second input of the voltage addition section U1 senses a voltage from a fixed voltage divider circuit 66. The output from the voltage divider circuit 66 for example, is negative 0.1 volts DC. The output of voltage addition section U1 is accordingly the sum of the input voltages sensed by U1. This output from U1 is inverted by voltage addition section U2 which is configured as a unity inverter. Thus, a typical output voltage from U1 may be minus 5.1 volts DC. The inverted output of U2 will be positive 5.1 volts DC. Element U3 is an op amp configured as a voltage subtractor. It receives the same inputs received by U1 and, for the negative 5 volts DC and negative 0.1 volt DC inputs, the output of U3 will be negative 4.9 volts DC.

Op amp U4 is a voltage comparator which compares a voltage window formed by the output of voltage addition section U1 and voltage subtraction section U3 with the APS which it receives from op amp U10. Thus, if the outputs of voltage addition section U1 and voltage subtraction section U3 are negative 5.1 volts DC and negative 4.9 volts DC, respectively, the voltage comparator function of op amp U4 forms a "window" of a 0.2 volts DC. The output transistor Q1 is only switched on when the APS voltage is within the 0.2 volts DC window bracketed by negative 5.1 and negative 4.9 volts DC. It will be seen from the foregoing that the 0.2 volt DC span about the setpoint is maintained for setpoints throughout the operating range of the circuit, preferably 0 through 12 volts DC, so that potentiometer P1 can be adjusted to any desired setpoint and the 0.2 volt DC window will be formed at the desired setpoint.

Continuing with the above example, a DVD display of 50 is interpreted as setting the analog position module 60 to a position of 50 units, corresponding to roughly half the robot finger travel. A voltage output from transistor Q1 will thus be present only when the fingers of the robot are positioned within plus or minus 1 count of 50.

The analog position sensor module 60 contains an additional electronic logic element 68 for determining whether the robotic fingers are within two displacement units of being opened or closed. This logic element 68 is referred to as a finger opened/closed logic element. In the opened/closed logic element 68, comparator U11 is configured to sense the APS voltage, and two voltage outputs from a fixed voltage divider circuit 70. By way of example, the voltage divider outputs may be 0.2 volts DC and 9.8 volts DC. The comparator U11 is configured so that when the APS falls below 0.2 volts DC, output transistor Q6 is turned on, signaling a finger closed position. When the APS rises above 9.8 volts DC, output transistor Q5 is turned on signaling a finger opened position.

Other embodiments may include a thermistor 62 connected to signal conditioning element U9 to compensate for temperature changes which in some applications may affect output linearity.

It will be apparent to one skilled in the art that while the illustrated embodiments are directed towards a robotic system for sensing and signal processing systems for a robotic gripper device, the invention can be practiced in a variety of robotic and soft automation systems. In particular, the invention may be practiced in a variety of robotic manipulators, including wrists and shoulder joint systems in which an activator member is translating with respect to a stationary member.

It will thus be seen that the invention efficiently attains the objects set forth above. Additions, subtractions, deletions and other modifications of the disclosed illustrated embodiments will be within the skill of one practiced in the art and are within the scope of the following claims. For example, the size of the window may be adjusted through the addition of a potentiometer in the fixed voltage divider 66. It is accordingly intended that all matter contained in the above description or shown in the accompanying drawings be interpreted as illustrative rather than in the limiting sense.

It is also to be understood that the following claims are intended to cover all generic and specific features of the invention as described herein, and all statements of the scope of the invention which, as a matter of language, might be said to fall therebetween.

Having described the invention, what is claimed as new and secured by Letters Patent is:

1. An electromechanical manipulator, comprising:
    gripper means for gripping objects, said gripper means including a body and a plurality of fingers;
    sensing means, for sensing the relative position of said plurality of fingers, said sensing means including one Hall effect sensor, and
    magnet means, disposed in at least one of said plural fingers, oriented with respect to said at least one Hall effect sensor in a bipolar slide-by mode arrangement,
    wherein said sensing means includes signal processing means for processing signals generated by said sensing means and representative of said relative position of said plurality of fingers, said signal processing means including
        signal amplifying means for amplifying signals generated by said sensing means and representative of said relative position of said plurality of fingers, and
        signal conditioning means, in communication with said signal amplifying means, for conditioning amplified signals generated by said amplifying means and representative of said relative position of said plurality of fingers, and
    wherein said sensing means generates a range of input values representative of a range of finger travel, and wherein said signal conditioning means further includes output range logic means for dividing said range of input values into a predetermined number of corresponding output subranges, and
    further comprising display means in association with said signal conditioning means, for displaying the output subrange to which a given input value corresponds, and
    wherein said signal conditioning means further includes
    setpoint means for establishing a plurality of adjustable output setpoint values, each corresponding to a predetermined input value, and
    comparator means for (i) comparing a given input value to each of said plurality of output setpoint values, and for (ii) transmitting an output signal indicative of an output setpoint value when said given input value falls within a predetermined threshold of an output setpoint value.

2. An electromechanical manipulator, comprising
    gripper means for gripping objects, said gripper means including a body and a plurality of fingers,
    sensing means, for sensing relative position of said plurality of fingers, said sensing means including at least one Hall effect sensor, said sensing means generating a range of input values representative of a range of finger travel,
    magnet means, disposed in at least one of said plural fingers, oriented with respect to said at least one Hall effect sensor in bipolar slide-by mode,
    signal processing means, in communication with said sensing means, for processing signals generated by said sensing means and representative of said relative position of said plurality of fingers, said signal processing means including (i) signal amplifying means for amplifying signals generated by said sensing means and representative of said relative position of said plurality of fingers, and (ii) signal conditioning means, in communication with said signal amplifying means, for conditioning amplified signals generated by said amplifying means and representative of said relative position of said plurality of fingers, said signal conditioning means further including output range logic means for dividing said range of input values into a predetermined number of corresponding output subranges,
    display means, in association with said signal conditioning means, for displaying the output subrange to which a given input value corresponds,
    setpoint means, in association with said signal conditioning means, for establishing a plurality of adjustable output setpoint values, each corresponding to a predetermined input value,
    comparator means, in association with said setpoint means, for (i) comparing a given input value to each of said plurality of output setpoint values, and for (ii) transmitting an output signal indicative of an output setpoint value when said given input value falls within a predetermined threshold of an output setpoint value, and
    threshold means, in communication with said comparator means, for setting said predetermined threshold.

3. An output device for processing a range of input signal values generated by a Hall effect sensor, comprising
    amplifier means for amplifying said signals produced by said Hall effect sensor,
    output range logic means, in communication with said amplifier means, for dividing said range of input values into a predetermined number of corresponding output subranges,
    setpoint means, in communications with said output range logic means, for setting a plurality of adjustable output setpoint values, each corresponding to a predetermined input signal value, and
    comparator means for (i) comparing a given input value to each of said plurality of output setpoint values, and for (ii) transmitting an output signal indicative of an output setpoint value when said given input value falls within a predetermined threshold of an output setpoint value.

4. An output device according to claim 3, further including threshold means, in communication with said comparator means, for setting said predetermined threshold.

5. An output device according to claim 4, wherein said threshold means includes a plurality of potentiometer means for calibrating said thresholds.

6. An output device according to claim 5, further including display means in association with said comparator means, for displaying the output subrange to which a given input value corresponds.

* * * * *